Feb. 21, 1928.
W. SCHMIDT
POWER PLANT
Filed Jan. 14, 1921
1,659,963
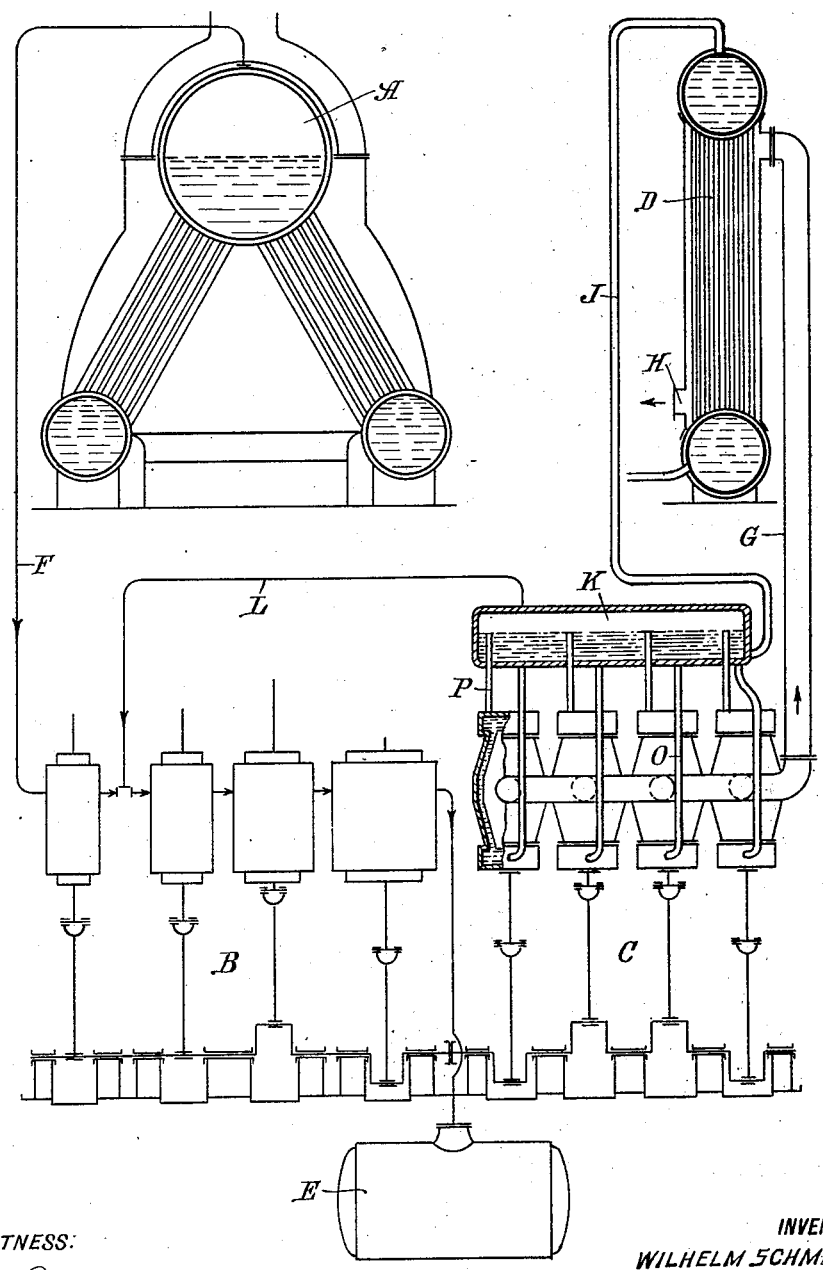
WITNESS:
INVENTOR
WILHELM SCHMIDT
BY
ATTORNEYS Patented Feb. 21, 1928.

1,659,963

UNITED STATES PATENT OFFICE.

WILHELM SCHMIDT, OF CASSEL-WILHELMSHOHE, GERMANY; SIMON HOFFMANN, OF CASSEL-WILHELMSHOHE, GERMANY, EXECUTOR OF SAID SCHMIDT, DECEASED, ASSIGNOR TO SCHMIDT'SCHE HEISSDAMPF G. M. B. H., OF CASSEL-WILHELMSHOHE, GERMANY, A CORPORATION OF GERMANY.

POWER PLANT.

Application filed January 14, 1921, Serial No. 437,200½, and in Germany December 11, 1919.

My invention relates to power plants, and particularly to such as comprise an internal combustion engine in combination with a steam engine. Power plants of this general character have been devised heretofore in which the waste heat of the internal combustion engine, and particularly the waste heat within the water jacket, has been utilized for generating steam, which steam in turn has been employed to drive the steam engine, or at least to assist in its operation. The advantage of such arrangements lies in the favorable thermic efficiency which, in case the duty of the steam plant is smaller than that of the internal combustion engine, may equal or even exceed that of a plant consisting exclusively of an internal combustion engine. Furthermore, the presence of a steam plant in addition to the internal combustion engine increases the reliability of the whole plant, since over-loads are permissible, and, in case of need, the arrangement may continue to operate without the internal combustion engine.

The advantages last mentioned make it appear desirable to increase, as far as possible, the share of the total work which falls upon the steam engine. It will, however, be evident that, other things being equal, an increase of the steam plant will bring about a reduction of the total thermic efficiency of the entire power plant since there will be a progressive reduction of the ratio which the waste heat of the internal combustion engine bears to the heat produced by the steam boiler furnace.

The object of the present invention is to increase the share of the steam engine in arrangements of the character referred to as far as possible, but at the same time, it reduces, as far as possible, the fuel consumption of the steam plant so that, for instance, in the case of a steam engine the duty of which is double that of the internal combustion engine, the total thermic efficiency of the entire plant will still equal, or at least, approximate that of an internal combustion engine used alone. By increasing the duty of the steam engine, the size of the cylinders of the internal combustion engine will be reduced considerably for a given total energy of the plant, and I also secure the further advantage that the internal combustion engine may be started with the aid of the steam engine, so that in many cases, the extensive and complicated arrangements for starting the internal combustion engine may be dispensed with.

In order to attain the object indicated above, it is essential that the steam power plant should be as perfect as possible. One of the best means for increasing the efficiency of the steam power plant by itself, that is to say, irrespective of the additional heat supplied by the internal combustion engine, lies in the use of a high steam pressure since, in this case, with proper arrangements, the operation of the steam engine is improved in several respects. Such high pressure is adapted to high expansion work and also affords the possibility of superheating the intermediate steam of compound steam engines and particularly, the steam of the lower expansion stages by means of live steam. It is well known that the efficiency of the steam engine can be increased materially by a sufficient superheating of the intermediate steam. This superheating of the intermediate steam, however, is not practicable, as a rule, in the case of large plants, for the reason that it is impossible, on account of the large steam volume, to convey the steam from the engine to the boiler furnace and back to the engine. When using high pressure steam, however, the intermediate steam may be superheated at the engine by live steam.

In power plants combining steam engines and internal combustion engines as constructed hereto, the cooling jacket of the internal combustion engine cylinders has been in direct communication with the steam boiler. Therefore, if the boiler pressure is increased, there will be a corresponding increase of pressure and consequently of temperature in the cooling jacket. This increase of temperature is liable to endanger the reliable operation of the internal combustion engine since the cylinder walls may become too hot. Furthermore, the high steam pressure would, in this case, require the walls of the jacket and of the cylinder head to be made very thick and this is a drawback from the point of view of construction. Again, with such a construction, there will be an unpleasant increase in the difficulty of preserving a tight joint between the cylinder and the head. For these reasons, it is possible only within certain limits to increase the efficiency of the power plant by increasing the steam pressure.

In order that the steam pressure in the steam power plant and its thermic efficiency may be increased to a maximum, this invention contemplates keeping the steam pressure in the cooling jacket below that in the steam boiler and conveying the steam of the cooling jacket to an intermediate stage of the steam engine whether the latter be a reciprocating piston engine or a turbine. Of course, a portion of the steam might be used for other purposes, for instance, for heating.

If the steam pressure be made sufficiently high, the improved arrangement enables me, when using a comparatively small steam unit, that is to say, one of a horsepower which is low relatively to the energy supplied by the internal combustion engine, to increase the total thermic efficiency of the plant materially above that which would be characteristic of a plant consisting exclusively of an internal combustion engine. If, however, we are satisfied with a medium total thermic efficiency; say, one approximating that of an internal combustion engine alone, the share of the steam engine energy relatively to that of the internal combustion engine may be increased materially, under certain circumstances up to about double the amount. In many cases, as in ship engines, such an increase is more desirable than the case above mentioned in which the steam engine performs a relatively small duty. In the case of single acting, four cycle internal combustion engines, the largest working cylinders which have been found practicable hereto, have a diameter of 700 millimeters. With a six cylinder engine, this means the production of about 2400 effective horse-power in one shaft. By the use of my present invention, with cylinders of the same size and with a practically equal fuel consumption per effective horse-power hour, I may obtain as much as 7200 effective horse-power from one shaft; or, to put it in a different way; if the shaft is to deliver only 2400 horse-power, then with my invention, using the same number of cylinders and the same piston speed, the diameter of the cylinders may be reduced to about 400 millimeters. This comparison will clearly indicate the material advantage secured by my invention.

If a pressure of 50 atmospheres is employed in the boiler of the steam power plant, and if, in addition thereto, we use all the expedients which have a favorable influence upon the operation of the steam engine, such as high superheating and in some cases, repeated superheating of the live steam and of the intermediate steam, and high vacuum, a higher degree of expansion, etc. then the steam coming from the steam boiler alone will require a heat consumption of about 2000 calories for each effective horse-power hour figured on the heat of the steam. The smaller the heat consumption of the steam engine by itself, the greater will be the influence of the utilization of the waste heat of the internal combustion engine. If, for instance, we consider a four cycle internal combustion engine with a heat consumption of 1800 colaries per effective horse-power hour of which 750 calories derived from the waste heat are utilizable for the production of steam; then assuming a boiler efficiency at 80%, the heat consumption of the steam boiler plant in fuel is reduced to $$\frac{2000-750}{0.8}=1562$$

calories per effective horse-power hour of the steam engine, if the steam engine and the internal combustion engine share equally in the total work. The consumption of heat figured with reference to the total energy will thus be found to be $$\frac{1800+1562}{2}=1681$$

calories per effective horse-power hour and this corresponds to a total thermic efficiency of 37.6%. If the steam engine is made to perform twice as much work as the internal combustion engine, the heat produced at the boiler for two effective horse-power hours of the steam engine will be $$\frac{4000-750}{0.8}=4062$$

calories or 2031 calories per horse-power hour. With reference to the total energy this indicates a heat consumption of $$\frac{4062+1800}{3}=1954$$

calories per effective horse-power hour. The total thermic efficiency even in this case is still 32.3% and therefore just as high as that of a two cycle internal combustion engine.

On the other hand, if we consider the case of a power plant the steam portion of which consists of a high class steam power plant with the usual steam pressure of 15 atmospheres, and a heat consumption of 2800 calories per effective horse-power hour in steam heat, the influence of the waste heat is far less, as will be seen from the following calculation.

The heat consumption at the steam boiler plant will be found to be about $$\frac{2800-750}{0.8}=2562$$

calories per effective horse-power hour. If the steam engine performs the same amount of work as the internal combustion engine, the heat consumption, with reference to the total energy, will amount to $$\frac{1800+2562}{2}=2181$$

calories per effective horse-power hour and the total thermic efficiency is only 28.9% as compared with 37.6% which was obtained when employing a high steam pressure.

If the work performed by the steam engine is double that of the internal combustion engine, the heat consumption per effective horse-power hour of the total energy will be 2623 calories, and the total thermic efficiency only 24% against 32.3% as in the case first assumed.

The figures found by the first calculations refer to a power plant employing the high steam pressure of 50 atmospheres in the cooling jacket as well as in the boiler. This will insure the greatest possible energy of steam for a given total efficiency, but it would be impossible for practical reasons, to construct the cylinders of the internal combustion engine in such a manner as to be sure of their reliable operation. If a steam pressure of 50 atmospheres exists in the cooling jacket, this would correspond to an evaporation temperature of 263° centigrade, and, with the very best construction of the cylinders, the temperature of the sliding surface of the piston would amount to about 290° centigrade, and this would seriously interfere with the proper motion of the piston and piston rings and even possibly render such motion impossible.

In order to avoid this drawback, the steam pressure in the cylinder jackets of the internal combustion engine is maintained below that of live steam, as has been mentioned herein above, and this steam, of lower pressure than the live steam, is preferably then conveyed to an intermediate stage of the steam engine. Any suitable means may be employed to insure that the steam pressure in the cylinder jackets of the internal combustion engine will remain below that of the live steam. Generally, a proper relative dimensioning of the several elements of the plant will be sufficient to insure this result. To guard against any abnormal conditions, and to insure said result positively, I may provide a blow-off valve set to allow the escape of steam from the cylinder jackets at a definite pressure, which would be below that of the live steam. If, for instance, the steam pressure in the cooling jacket is taken at 12 atmospheres, which corresponds to a cooling water temperature of 187° centigrade, the temperature of the sliding surface of the piston will be only about 210°, if the cylinder is properly constructed, and this temperature will not interfere with the proper operation of the engine. The economic or efficiency result will, however, remain approximately the same as if a high steam pressure were employed in the cooling jacket. By means of the expedients described above, and particularly owing to the high boiler pressure avalable for the intermediate superheating the heat consumption of the steam engine with a live steam pressure of 12 atmospheres, may be brought to about 2350 calories per effective horse-power. The share of this lower value utilization of the steam is, however, only a fraction of the total steam energy. Utilizing the waste heat of the internal combustion engine at the rate of 750 calories per effective horse-power hour, a steam energy of about $$\frac{750}{2350}=0.32$$

effective horse-power hour can be performed. The amount of steam to be supplied by the boiler per effective horse-power hour of the total steam work, will in this case amount to $$\frac{2000\times 0.68}{0.8}=1700$$

calories, or altogether, for two effective horse-power hours of the total work, $$1800+1700=3500$$

calories; that is to say, 1750 calories per effective horse-power hour; this corresponds to a total thermic efficiency of 36.1%.

If the work performed by the steam engine is double that of the internal combustion engine, the calculation will be as follows. In order to produce 1.68 effective horse power per hour at the boiler plant, there will have to be supplied $$\frac{1.68\times 2000}{0.8}=4200$$

calories, altogether, therefor, for three effective horse-power hours, $1800+4200=6000$ calories, or for one effective horse-power hour, $$\frac{6000}{3}=2000$$

calories; this corresponds to a total thermic efficiency of 31.6%. As has been explained above, the loss resulting from the use of a lower pressure in the cooling jacket of the internal combustion cylinder, as compared with a plant using the boiler pressure or other high evaporation pressure in said cooling jacket, may be considered negligible in view of the great practical advantages.

By using a relatively low steam pressure in the water jacket, I secure also the advantage, as stated above, of a relatively moderate temperature at the sliding surface of the piston and cylinder. A further reduction of this temperature may be obtained by employing in the cylinder a combustion pressure lower than usual; for in this case, the heat transfer to the cooling medium is diminished and a portion of the heat which otherwise would pass into the jacket is carried away by the exhaust gases from which it may be recovered more readily.

Both expedients, (reducing the steam pressure in the cooling jacket and the combustion pressure in the cylinder) when used together, permit the wall thickness of the cylinder to be reduced to the practically allowable minimum and thus reduce correspondingly the strains to which the cylinder walls are subjected by heat influences. The formation of cracks in the cylinder walls is thus avoided with certainty.

Furthermore, a reduction of the combustion pressure offers the advantage of permitting the combustion temperature to be reduced without any sacrifice at all in the mechanical efficiency. This may be explained as follows.

The lower pressure or strain which is placed on the piston rods and other rods in this case enables such rods to be made of relatively small dimensions thereby reducing the losses by friction. As soon, however, as the indicated horse-power or work, which depends on the increase of the combustion temperature during combustion, and the friction work, are in a certain constant relation to each other, the mechanical efficiency remains unaltered, even under present practice the combustion temperature is reduced, while maintaining the usual combustion pressure of 36 atmospheres, in many internal combustion engines where unusual reliability of operation is required, as for instance, in the propulsion of ships. The mechanical efficiency, which, even without such reduction, is quite low, is further reduced in this manner. If, however, the combustion pressure is reduced, the combustion temperature may be reduced in the same proportion without altering the mechanical efficiency. Thus I obtain, in a two-fold manner, a further increase in the reliable operation of the internal combustion engine.

The large share of work performed by the steam engine relatively to that performed by the internal combustion engine presents the further advantage that the steam engine may be utilized for starting the internal combustion engine, and also for manœuvring and reversing, which is an advantage of particular importance in the propulsion of ships. This arrangement is especially favorable when the combustion pressure has been reduced, because in this case the resistance opposed when starting is smaller, owing to the reduction in the strains of the piston rod and other rods, than in a plant employing the usual high combustion pressure, assuming, of course, the same horse-power. Thus I avoid the expensive and complicated compressed air tanks, pipes and adjuncts, as well as the complicated distributing arrangements at the cylinders of the internal combustion engine and further, the danger of heat cracks being formed in the cylinder walls by the sudden cooling of the hot cylinder walls when manœuvring.

The drawing illustrates a preferred embodiment of the present invention. A is a steam boiler, B is a four-phase reciprocating piston steam engine, C is a four cylinder internal combustion engine, D is a water pre-heater and E is a condenser. The steam engine and the internal combustion engine operate on the same shaft.

The boiler A produces steam which is conducted to the high pressure cylinder of the steam engine through a conduit F. The steam is serially expanded in the various phases of this engine and is finally condensed in E. The exhaust gases of the internal combustion engine are conducted through pipe G to the pre-heater D, and pass out of the latter at H in a cooled condition. The water that has been heated in D is conducted through pipe G to the water compartment of a steam container K, the latter being located above the cylinders of the internal combustion engine. The water compartment of this container is connected by means of pipes O with the lower part of the cooling jackets. The upper parts of the cooling jackets are connected by means of steam pipes P with the steam compartment of container K. The steam is conducted from this container through the pipe L to a receiving chamber located between the high and middle pressure cylinders of the steam engine. At S, I have indicated a safety valve or blow-off valve on the steam compartment of the container K, said valve being set so as to release steam from this compartment if the pressure therein should rise above the intended point. With this arrangement, therefore, the pressure in said compartment and in the pipe L will always be maintained below the pressure of the live steam. The steam blowing off through the safety valve S may be conveyed, as through a pipe L', to a place of use, for instance a radiator or other heating apparatus.

Various changes in the specific form shown and described may be made without departing from the spirit of my invention as set forth in the appended claims.

I claim:

1. A power plant comprising a boiler, a compound steam engine receiving steam from said boiler, an internal combustion engine having a cooling water jacket in which steam is generated by the heat of said internal combustion engine and in which there is maintained a pressure below that of the boiler, and a connection for conveying the steam generated in said jacket, between two stages of said compound engine.

2. A power plant comprising a compound steam engine the high-pressure stage of which receives steam of at least 20 atm. from a source of supply, an internal combustion engine having a steam generating cooling jacket and a connection leading from the steam space of said jacket to a point between two stages of said compound engine.

3. A power plant comprising a boiler, a compound steam engine receiving steam from said boiler, at a pressure of at least 20 atm., an internal combustion engine having a cooling water jacket in which steam is generated by the heat of said internal combustion engine and in which there is maintained a pressure below that at which the high pressure steam is led to said steam engine, and a connection for conveying the steam generated in said jacket to the said compound steam engine between two stages of said engine, the capacity of the steam engine being at least approximately one-half of the power capacity of the entire plant, and the total thermic efficiency of the power plant being substantially equal to the thermic efficiency of an internal combustion engine.

4. A power plant comprising a multi-stage steam engine having a high-pressure cylinder, a low-pressure cylinder, and a conduit therebetween for leading the exhaust steam of the high-pressure cylinder to the low-pressure cylinder; an internal combustion engine having a plurality of cylinders, both engines working on the same shaft; a low-pressure boiler; and a feed water heater adapted to preheat the feed water for the said low-pressure boiler, the latter consisting of water jackets surrounding said cylinders, a steam and water collector common to and arranged above said water jackets, tubes connecting the upper portions of said water jackets to the steam space of said collector, return tubes connecting the water space of said collector with the lower portions of said water jackets; a connection between the hot water end of the said feed water heater and the water space of the said collector; a second connection between the steam space of the said collector and said conduit; a boiler for supplying high pressure steam to the high pressure cylinder of the steam engine; and a connection leading the exhaust gases of the internal combustion engine cylinders through said feed water heater.

In testimony whereof I have hereunto set my hand.

WILHELM SCHMIDT.